United States Patent
Joshi et al.

(10) Patent No.: US 7,200,251 B2
(45) Date of Patent: Apr. 3, 2007

(54) METHODS AND SYSTEMS FOR MODELING OBJECTS AND OBJECT IMAGE DATA USING MEDIAL ATOMS

(75) Inventors: Sarang Joshi, Chapel Hill, NC (US); Edward L. Chaney, Efland, NC (US); Stephen M. Pizer, Chapel Hill, NC (US); P. Thomas Fletcher, Chapel Hill, NC (US); Andrew Thall, Chapel Hill, NC (US)

(73) Assignee: The University of North Carolina, Chapel Hill, NC (US)

( * ) Notice: Subject to any disclaimer, the term of this patent is extended or adjusted under 35 U.S.C. 154(b) by 562 days.

(21) Appl. No.: 10/259,039

(22) Filed: Sep. 27, 2002

(65) Prior Publication Data

US 2003/0156111 A1     Aug. 21, 2003

Related U.S. Application Data

(60) Provisional application No. 60/326,623, filed on Sep. 28, 2001.

(51) Int. Cl.
*G06K 9/00*     (2006.01)
(52) U.S. Cl. .......................... 382/128; 345/420; 703/2; 703/11
(58) Field of Classification Search ................ 382/128, 382/129, 130, 131, 132–134; 600/443, 449, 600/587; 703/2, 11, 12; 702/27, 138; 436/86, 436/89; 736/89; 345/420; 706/932; 704/250, 704/255, 256.4, 261, 266; 700/29–31, 98
See application file for complete search history.

(56) References Cited

U.S. PATENT DOCUMENTS

| | | | | |
|---|---|---|---|---|
| 4,881,175 A | * | 11/1989 | Ladner | 702/138 |
| 5,572,439 A | * | 11/1996 | Nishida et al. | 702/27 |
| 5,583,973 A | * | 12/1996 | DeLisi et al. | 345/420 |
| 5,600,570 A | * | 2/1997 | Imasato et al. | 702/27 |
| 5,926,568 A | | 7/1999 | Chaney et al. | |
| 6,161,080 A | * | 12/2000 | Aouni-Ateshian et al. | 703/11 |
| 6,243,075 B1 | * | 6/2001 | Fishkin et al. | 345/156 |

OTHER PUBLICATIONS

Han et al., "Representing Multi-Figure Anatomical Objects," International Symposium on Biomedical Imaging (ISBI), pp. 1251-1254 (2004).

(Continued)

*Primary Examiner*—Jingge Wu
*Assistant Examiner*—Abolfazl Tabatabai
(74) *Attorney, Agent, or Firm*—Jenkins, Wilson, Taylor & Hunt, P.A.

(57) ABSTRACT

Methods and systems for modeling objects and object image data using medial atoms are disclosed. Objects and object image data can be modeled using medial atoms. Each medial atom includes at least two vectors having a common tail and extending towards an implied boundary of a model. The medial atoms may be aligned along one or more medial axes in the model. The model may include multiple sub-components, referred to as figures. The model and each of its figures may be represented in model-based and figure-based coordinates. The model may be automatically deformed into target image data using a hierarchy of geometric or probabilistic transformations.

50 Claims, 9 Drawing Sheets

OTHER PUBLICATIONS

Pizer et al., "Multiscale Medial Loci and Their Properties," Int. J. Comp. Vis., pp. 1-33 (Sep. 12, 2002).

Damon, "Determining the Geometry of Boundaries of Objects from Medial Data," International Journal of Computer Vision, Department of Mathematics, University of North Carolina at Chapel Hill, pp. 1-27 (2002).

Fletcher et al., "Deformable M-rep Segmentation of Object Complexes," Proc. Int. Symp. Biomed. Imaging, CD Proceedings, pp. 1-4 (2002).

Pizer et al., "Object Models in Multiscale Intrinsic Coordinates via M-reps," First International Workshop on Generative-Model-Based Vision (GMBV 2002), AEC Pece, ed. Technical Report DIKU-TR-Jan. 2002, pp. 1-9 (2002).

Thall, "Fast $C^2$ Interpolating Subdivision Surfaces Using Iterative Inversion of Stationary Subdivision Rules," University of North Carolina Computer Science Department, Technical Report TR02-001, pp. 1-29 (2002).

Gerig et al., "Valmet: A New Validation Tool for Assessing and Improving 3D Object Segmentation," Proc. MICCAI 2001, Springer LNCS 2208, pp. 516-523 (2001).

Styner et al., "Medial Models Incorporating Object Variability for 3D Shape Analysis," Information Processing in Medical Imaging (IPMI '01), Lecture Notes in Computer Science, Springer 2082, pp. 502-516 (2001).

Styner et al., "Statistical Shape Analysis of Neuroanatomical Structures Based on Medial Models," Medical Image Analysis 7, pp. 207-220 (2000).

Kelemen et al., "Elastic Model-Based Segmentation of 3-D Neuroradiological Data Sets," IEEE Transactions on Medical Imaging, vol. 18, No. 10, pp. 828-839 (Oct. 1999).

Chen et al., "Using Multiscale Medial Models to Guide Volume Visualization," Tech Report TR99-014, Dept. of Comp. Sci., Univ. of NC at Chapel Hill, pp. 1-8 (Mar. 2, 1999).

Delingette, "General Object Reconstruction Based on Simplex Meshes," International Journal of Computer Vision, 32(2), pp. 111-146 (1999).

Markosian et al., "Skin: A Constructive Approach to Modeling Free-Form Shapes," Computer Graphics Proceedings, Annual Conference Series, ACM SIGGRAPH, pp. 393-400 (1999).

Pizer et al., "Segmentation, Registration, and Measurement of Shape Variation via Image Object Shape," IEEE Transactions on Medical Imaging 18(10), pp. 851-865 (1999).

Siddiqi et al., "The Hamilton-Jacobi Skeleton," ICCV'99 Proceedings, IEEE, pp. 828-834 (1999).

Amenta et al., "A New Voronoi-Based Surface Reconstruction Algorithm," Computer Graphics Proceedings, Annual Conference Series, ACM SIGGRAPH, pp. 415-422 (1998).

Singh et al., "Wires: A Geometric Deformation Technique," Computer Graphics Proceedings Annual Conference Series, ACM SIGGRAPH, pp. 405-414 (1998).

Fritsch et al., "Localization and Segmentation of Medical Image Objects using Deformable Shape Loci," Information Processing in Medical Imaging (IPMI), J Duncan & G Gindi, eds., Lecture Notes in Computer Science 1230, pp. 127-140 (1997).

Jones et al., "Segmentation Using Models with Affinity-Based Localization," Lecture Notes in Comp. Sci. #1205, J. Troccca et al. (eds), Proc CVRMED-MRCAS '97, Springer, pp. 53-62 (1997).

McInerney et al., "Medical Image Segmentation Using Topologically Adaptable Surfaces," Lecture Notes in Comp. Sci. #1205, J. Trocca, et al. Proc. CVRMED-MRCAS '97, Springer, pp. 23-32 (1997).

Montagnat et al., "Volumetric Medical Images Segmentation Using Shape Constrained Deformable Models," Lecture Notes in Comp. Sci.#1205, J. Trocca et al. (eds), Proc CVRMED-MRCAS '97, Springer, pp. 13-22 (1997).

Vehkomaki et al., "A User-Guided Tool for Efficient Segmentation of Medical Image Data," Lecture Notes in Comp. Sci. #1205, J. Trocca, et al. Proc. CVRMED-MRCAS '97, Springer, pp. 685-694 (1997).

Burbeck et al., "Linking Object Boundaries at Scale: a Common Mechanism for Size and Shape Judgements," Vision Research, vol. 36, No. 3, pp. 361-372 (1996).

McAuliffe et al., "Scale-Space Boundary Evolution Initialized by Cores," Proceedings of the 4th International Conference on Visualization in Biomedical Computing, Hamburg, IEEE Computer Society Press, Los Alamitos, CA, pp. 173-183 (1996).

McInerney et al., "Deformable models in medical image analysis: a survey," Medical Image Analysis, vol. 1, No. 2, pp. 91-108 (1996).

Morse et al., "Zoom-Invariant Vision of Figural Shape: Effects on Cores of Image Disturbances," University of North Carolina Technical Report TR 96-005, pp. 1-36 (1996).

Staib et al., "Model-Based Deformable Surface Finding for Medical Images," IEEE Trans. Med. Imag., vol. 15, No. 5, pp. 720-731 (1996).

Szekely et al., "Segmentation of 2-D and 3-D objects from MRI volume data using constrained elastic deformation of flexible Fourier contour and surface models," Medical Image Analysis, vol. 1, No. 1, pp. 19-34, Oxford University Press (1996).

Bittar et al., "Automatic Reconstruction of Unstructured 3D Data: Combining a Medial Axis and Implicit Surfaces," Computer Graphics Forum (Eurographics '95), vol. 14, No. 3, pp. 457-468. (1995).

Burbeck et al., "Object Representation by Cores: Identifying and Representing Primitive Spatial Regions," Vision Research, vol. 35, No. 13, pp. 1917-1930 (1995).

Fritsch et al., "Core-Based Portal Image Registration for Automatic Radiotherapy Treatment Verification," Int. J. Radiat. Oncol. Biol. Phys., vol. 33, No. 5, pp. 1287-1300 (1995).

Johnson et al., "Analysis and Reconstruction of Medical Images Using Prior Information," Case Studies in Applied Bayesian Statistics II, pp. 149-238 (Springer-Verlag, 1995).

Lee et al., "Neural Correlates of Boundary and Medial Axis Representations in Primate Striate Cortex," Investigative Ophthalmology and Visual Science Annual Meeting, Abstract #2205 (1995).

Pizer et al., "3-D Image-Guided Surgery via Registration of Intraoperative and Preoperative Images," Proc. Conf. on Virtual Reality in Surgery and Medicine, Leeds, UK (1995).

Pizer et al., "Stimulated Cores and their Applications in Medical Imaging," Infor. Proc. in Med. Imaging, pp. 1-15 (1995).

Pizer et al., "Objects, Boundaries, and Medical Image Analysis," University of North Carolina at Chapel Hill, TR94-069 (Dec. 1994).

Morse et al., "Multiscale medial analysis of medical images," Image and Vision Computing, vol. 12, No. 6, pp. 327-338 (Jul./Aug. 1994).

Eberly et al., "Ridges for Image Analysis," Journal of Mathematical Imaging and Vision, 4:351-371 (Jun. 1994).

Chakraborty et al., "Deformable Boundary Finding Influenced by Region Homogeneity," Proc Conf Computer Vision and Pattern Recognition (CVPR '94), pp. 624-627 (1994).

Cootes et al., "The Use of Active Shape Models for Locating Structures in Medical Images," Image and Vision Computing, vol. 12, No. 6, pp. 355-366 (1994).

Eberly, "A Differential Geometric Approach to Anisotropic Diffusion," Geometry-Driven Diffusion In Computer Vision, BM ter Haar Romeny (ed.), Kluwer Academic Publishers: pp. 371-392 (1994).

Fritsch et al., "Cores for Image Registration," Medical Imaging 1994; Image Processing, M.H. Loew, ed., SPIE Proceedings vol. 2167, pp. 128-142 (1994).

Fritsch et al., "The multiscale medial axis and its applications in image registration," NH Elsevier, Pattern Recognition Letters 15, pp. 445-452, May (1994).

Lindeberg et al., "Chapter 1: Linear Scale Space I: Basic Theory, and Chapter 2: Linear Scale-Space II: Early Visual Operations, Geometry-Driven Diffusion in Computer Vision," Kluwer Academic Publishers, Dordrecht, pp. 1-72 (1994).

Lindeberg, "Scale-Space Theory in Computer Vision," Kluwer Academic Publishers, Boston, pp. 149-162 (1994).

Liu et al., "Volume registration using the 3D core," Proceedings of Visualization in Biomedical Computing, SPIE Proc. vol. 2359, pp. 217-226 (1994).

Morse et al., "General shape and specific detail: Context-dependent use of scale in determining visual form," Proc. 2nd Int'l Workshop on Visual Form: 374-383, World Scientific, Singapore (1994).

Morse et al., "Robust Object Representation Through Object-Relevant Use of Scale," Information Processing in Medical Imagine, SFIE 2167, pp. 104-115 (IPMI '94).

Pizer et al., "Core-based boundary claiming," Med. Imaging '94: Image Proc., SPIE 2167, pp. 151-159 (1994).

Pizer et al., "Object Shape before Boundary Shape: Scale-space Medial Axes," Presented at Shape in Picture (NATO Advanced Research Workshop), Journal of Mathematical Imaging and Vision, vol. 4, pp. 303-313 (1994).

Tracton et al., "MASK: Combining 2D and 3D Segmentation Methods to Enhance Functionality," Math. Methods Med. Imaging III, SPIE Proc. 2299, pp. 98-109 (1994).

Vermeer, "Medial Axis Transform to Boundary Representation Conversion," UMI Dissertation Services, Purdue University (1994).

Fritsch, "Registration of Radiotherapy Images Using Multiscale Medial Descriptions of Image Structure," Ph.D. dissertation, Department of Biomedical Engineering, University of North Carolina at Chapel Hill (1993).

Gilhuijs et al., "Automatic on-line inspection of patient setup in radiation therapy using digital portal images," Med. Phys., vol. 20, No. 3, pp. 667-677 (1993).

Leymarie et al., "Tracking Deformable Objects in the Plane Using an Active Contour Model," IEEE Trans. PAMI, vol. 15, No. 6, pp. 617-634 (1993).

Pizer et al., "Human Perception and Computer Image Analysis of Objects in Images," Proc. Conf. of the Australia Pattern Recognition Society (DICTA), vol. 1, pp. 19-26 (1993).

van den Elsen et al., "Medical Image Matching--A Review with Classification," IEEE Eng. Med. Biol., vol. 12:1, pp. 26-39 (1993).

Balter et al., "Correlation of projection radiographs in radiation therapy using open curve segments and points," Med. Phys., vol. 19 (2), pp. 329-334 (1992).

Balter, "Registration of radiographs in radiation therapy using open curve segments: Method and applications," Doctoral dissertation, University of Chicago, pp. 1-144 (1992).

Boyer et al., "A review of electronic portal imaging devices (EPIDs)," Med. Phys., vol. 19 (1), pp. 1-16 (1992).

Vaillant et al., "Using External Boundaries for 3-D Object Modeling," IEEE Transactions on Pattern Analysis and Machine Intelligence, vol. 14, No. 2, pp. 157-173 (1992).

Bookstein, "Morphometric Tools for Landmark Data," Geometry and Biology, Cambridge University Press, pp. 55-87 (1991).

Sherouse et al., "The Portable Virtual-Simulator," Int. J. Radiation Oncology Biol. Phys., vol. 21, pp. 475-482 (1991).

Sherouse et al., "Computation of Digitally Reconstructed Radiographs for Use in Radiotherapy Treatment Design," Int. J. Radiat. Oncol. Biol. Phys, vol. 18, pp. 651-658 (1990).

Brookstein, "Principal Warps: Thin-plate splines and the decomposition of Deformations," 11 IEEE Trans. Pattern Anal. and Machine Intell., pp. 567-585 (1989).

Borgefors, "Hierarchical Chamfer Matching: a Parametric Edge Matching Algorithm," IEEE Trans PAMI, vol. 10, No. 6, pp. 849-865 (1988).

Kass et al., "Snakes: Active Contour Models," Int. J. Comp. Vision 1, pp. 321-331 (1988).

Press et al., "Numerical Recipes: The Art of Scientific Computing," Cambridge University Press, Cambridge, MA, pp. 635-642 (1986).

Wyvill et al., "Data Structure for Soft Objects," Visual Computer 2(4), pp. 227-234 (1986).

Nackman et al., "Three-Dimensional Shape Description Using the Symmetric Axis Transform, I: Theory," IEEE Transactions on Pattern Analysis and Machine Intelligence, vol. PAMI 7, No. 2, pp. 187-202 (1985).

Borgefors, "An Improved Version of the Chamfer Matching Algorithm," Proc. 7th Inf. Conf. Pattern Recognition, pp. 1175-1177 (1984).

Blum et al., "Shape Description Using Weighted Symmetric Axis Features," Pattern Recognition, vol. 10, pp. 167-180 (1978).

Catmull et al., "Recursively Generated B-spline Surfaces on Arbitrary Topological Meshes," Computer Aided Design 10, pp. 183-188 (1978).

Marr et al., "Representation and Recognition of the Spatial Organization of Three-Dimensional Shapes," Proc Royal Soc, Series B. 200, pp. 269-294 (1978).

Psotka, "Perceptual Processes That May Create Stick Figures and Balance," Journal of Experimental Psychology: Human Perception and Performance, vol. 4, No. 1, pp. 101-111 (1978).

Frome, "A Psychophysical Study of Shape Alignment," Technical Report TR-198, Computer Science Center, University of Maryland, pp. 1a-42 (1972).

Blum, "A New Model Of Global Brain Function," Perspectives in Biology & Medicine, 10, pp. 381-407 (1967).

Blum, H., "A Transformation for Extracting New Descriptors of Shape," In W. Wathen-Dunn, ed., Models for the Perception of Speech and Visual Form, MIT Press, Cambridge, MA, pp. 363-380 (1967).

Hu, "Visual Pattern Recognition by Moment Invariants," IRE Trans. Info. Theory, vol. 8, No. 2, pp. 179-187 (1962).

* cited by examiner

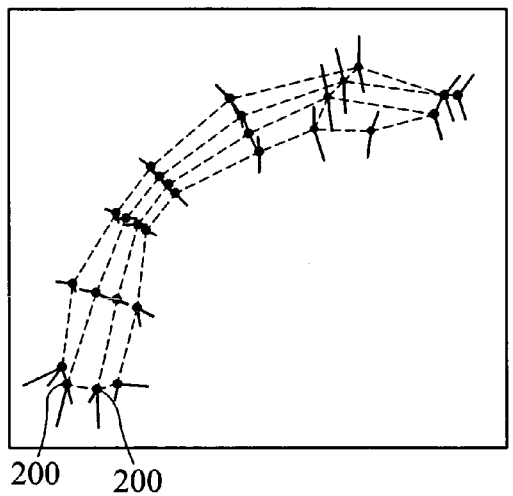# 
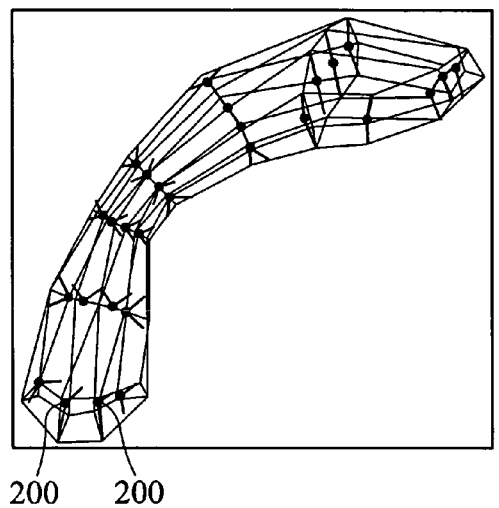
FIG. 5A
FIG. 5B
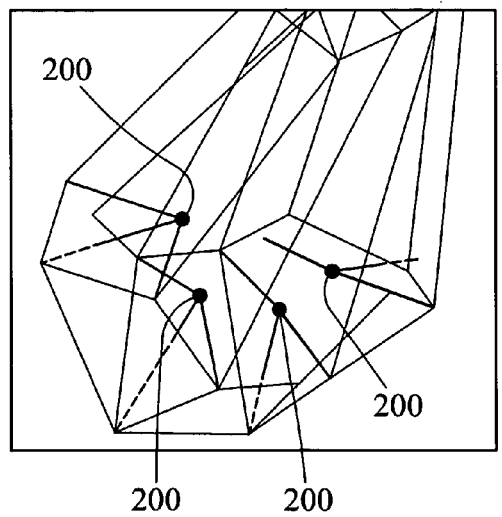
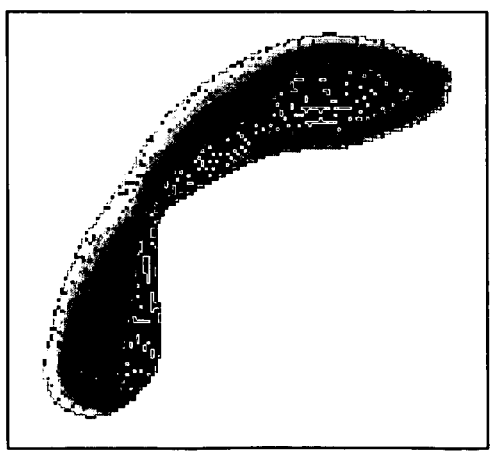
FIG. 5C
FIG. 5D

METHODS AND SYSTEMS FOR MODELING OBJECTS AND OBJECT IMAGE DATA USING MEDIAL ATOMS

RELATED APPLICATIONS

This application claims the benefit of U.S. Provisional Patent Application No. 60/326,623 filed Sep. 28, 2001, the disclosure of which is incorporated herein by reference in its entirety.

GRANT STATEMENT

This work was supported by NIH Grant Numbers 1-P01 CA47982-04, 1 RO1 LM05508-1, and 1 RO1 CA67183. Thus, the U.S. Government has certain rights to this invention.

TECHNICAL FIELD

The present invention relates to methods and systems for modeling objects and object image data. More particularly, the present invention relates to methods and systems for modeling objects and object image data using medial atoms.

BACKGROUND ART

In the fields of medicine, computer aided design, and computer aided modeling, it is often necessary to generate computer models of real objects. For example, in the field of medicine, images of anatomical structures are obtained using magnetic resonance imaging (MRI) and computer tomography (CT). Both MRI and CT images are used for diagnostic and treatment purposes. For example, in the field of radiation oncology, CT images are used by physicians to determine the appropriate radiation dosage amount and dosage area for patients undergoing radiation therapy. In radiation therapy, it is desirable that the dosage amount be tailored to the size of the tumor being treated and focused only on the area of the tumor being treated since radiation can harm healthy cells.

Conventional MRI- and CT-based methods for determining radiation therapy dosage areas and amounts involve examining MRI and CT images, manually drawing a map of the dosage area on the images, and making the corresponding marks on the patient on which to focus the radiation beam. While these manual methods are somewhat effective in determining the appropriate dosage amount, it is desirable to improve the accuracy of these methods and decrease the time required to plan a dosage amount. Thus, radiation therapy is one field that would benefit from improved object and image modeling techniques.

On example of an object and image modeling system is disclosed in U.S. Pat. No. 5,926,568 to Chaney et al. (hereinafter, "the '568 patent"), the disclosure of which is incorporated herein by reference in its entirety. According to the '568 patent, automatic image recognition of standard shapes is performed using deformable segments, the changes of which are measurable against a deformed model corresponding to an object in a subsequent image. Statistical correlation techniques optimize the match to further refine the shape of the subsequent image. While the methods and systems disclosed in the '568 patent decrease the time and improve the accuracy of image object matching, the image and object models disclosed therein are two-dimensional. Thus, improved tools for modeling three-dimensional structures and for deforming three-dimensional models into image data are needed.

Conventional computer-based modeling methods for three-dimensional structures involve constructing meshes that represent the surface of the object being modeled. Each point on the surface of a mesh is represented by a point in a model-independent coordinate system, such as a Cartesian coordinate system, a polar coordinate system, or a spherical coordinate system. Representing each point on the surface of a mesh with a model-independent coordinate system greatly increases the difficulty in comparing models to target images, determining correspondence between models, and deforming the surfaces of models. For example, it may be desirable to perform natural actions, such as increasing or decreasing the girth of a model, bending the model, elongating the model, or twisting the model. The mathematical computations required for performing these actions using a model-independent coordinate system greatly increase processing time required for these operations because each point must be independently moved. Accordingly, there exists a long felt need for improved methods and systems for modeling objects and object image data and matching models to target image data.

DISCLOSURE OF THE INVENTION

According to one aspect of the invention, a method for modeling objects and object image data using medial atoms is disclosed.

As used herein, the term "object" refers to a real-world structure, such as an anatomical structure, desired to be modeled. The term "object image data" refers to a set of data collected by a sensor from an object and stored on a computer. Examples of object image data include CT scan data, MRI data, x-ray data, digital photographs, or any other type of data collected from the real world that can be represented by a set of pixel intensities and positions.

As used herein, the term "medial atom" refers to a collection of vectors having predetermined relationships with respect to each other and with respect to one or more medial axes in a model. The term "medial axis," as used herein, refers to a set of points equidistant from tangent points on opposite surfaces of a model and located at the intersections of orthogonal lines from the tangent points within the surfaces.

Medial atoms may be grouped together to form models. As used herein, the terms "model" and "stock model" are each used to refer to a medial atom representation of an object or of object image data. A medial atom model may include a single figure or multiple figures. As used herein, the term "figure" refers to a component or a sub-component of a model. For example, some models may have only a single figure. An example of an object that can be represented by a single figure is an object with a relatively simple shape, such as a kidney. An example of an object that may require multiple figures for accurate modeling is a human hand. A medial atom based model of a hand may include a main figure consisting of the palm of the hand and subfigures consisting of each finger of the hand.

According to another aspect of the invention, a stock model may be automatically deformed to match target image data by altering one or more of the medial atoms. Exemplary alterations that may be performed on the medial atoms included resizing the medial atoms to increase or decrease the girth of the stock model, rotating the medial atoms to twist the surface of the stock model, and moving the medial atoms to bend or elongate the stock model. Because the present invention allows natural operations, such as elongating, bending, rotating, twisting, and increasing or decreasing girth on a stock model, the amount of time and processing required to deform the model into target image data is reduced.

Accordingly, it is an object of the invention to provide methods and systems for generating stock models using medial atoms and for automatically deforming the models to match image data using natural shape-based operations.

It is another object of the invention to provide methods and systems for generating stock models using a model-based coordinate system.

Some of the objects of the invention having been stated hereinabove, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which:

FIG. 5A is a perspective view of a three-dimensional medial atom model of object or image data according to an embodiment of the present invention;

FIG. 5B is a perspective view of the medial atom model illustrated in FIG. 5A including a coarse mesh joining the sails of the medial atoms according to an embodiment of the present invention;

FIG. 5C is a perspective view of an end mesh implied by the medial atom model illustrated in FIG. 5A;

FIG. 5D is a perspective view of an interpolated surface generated based on the medial atom structure illustrated in FIG. 5A;

DETAILED DESCRIPTION OF THE INVENTION

Exemplary Operating Environment

Figure 1:
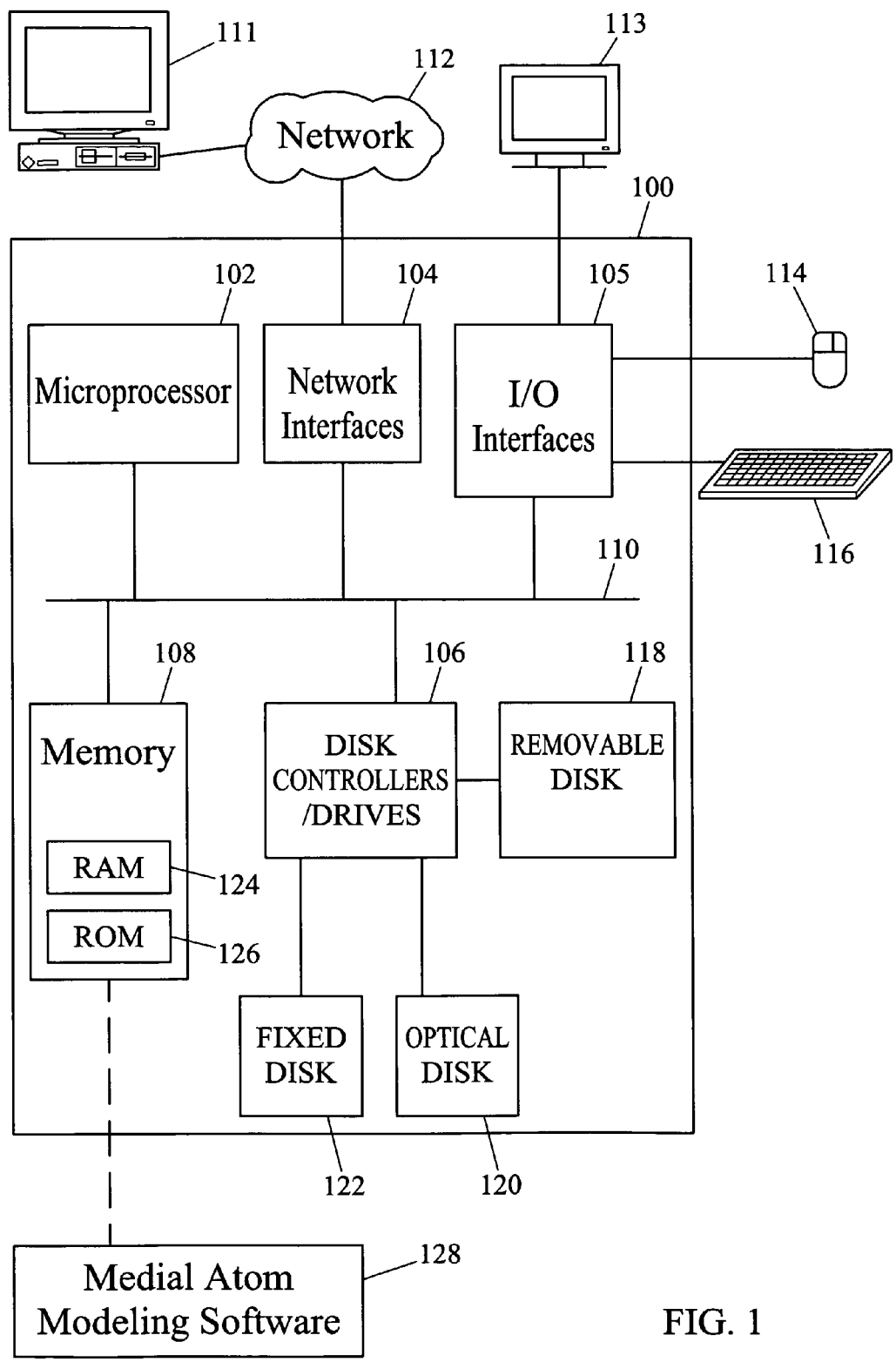
FIG. 1 is a block diagram of a general purpose computing platform on which the methods and systems of the present invention may be implemented.

The present invention includes methods and systems for modeling objects and object image data using medial atoms. The methods and systems of the present invention can be implemented in hardware, firmware, software, or any combination thereof. In one exemplary embodiment, the methods and systems for image modeling objects and object image data using medial atoms may be implemented as application software adapted to execute on a general purpose computer. FIG. 1 illustrates an exemplary operating environment for the methods and systems for modeling objects and object image data using medial atoms according to an embodiment of the present invention. Referring to FIG. 1, computer 100 includes a microprocessor 102, network interfaces 104, I/O interfaces 105, disk controllers/drives 106, and memory 108 connected via bus 110. Microprocessor 102 may be any type of general-purpose processor suitable for executing application software. An exemplary microprocessor suitable for use with embodiments of the present invention is any of the Pentium family of processors available from Intel Corporation.

Network interfaces 104 may include one or more network adapter cards that communicate with one or more remote computers 111 via network 112. For example, network interfaces 104 may be Ethernet or ATM cards.

I/O interfaces 105 may provide serial ports for communicating with external devices, such as display device 113, mouse 114, and keyboard 116. I/O interfaces 105 may also include interfaces for other types of input and output devices, such as microphones and speakers.

Disk controllers/drives 106 may include hardware components for reading to and writing from storage devices, such as removable disks 118, optical disks 120, and fixed disk 122.

Memory 108 may include random access memory 124 and read only memory 126 for storing instructions to be executed by microprocessor 102. According to the present invention, memory 108 may store an instance of medial atom modeling software 128 for modeling objects and object image data using medial atoms. Medial atom modeling software 128 may also automatically deform medial atom models into image data. Exemplary modeling and deformation operations performed by media atom modeling software 128 will be described in more detail below.

Figure 2A:
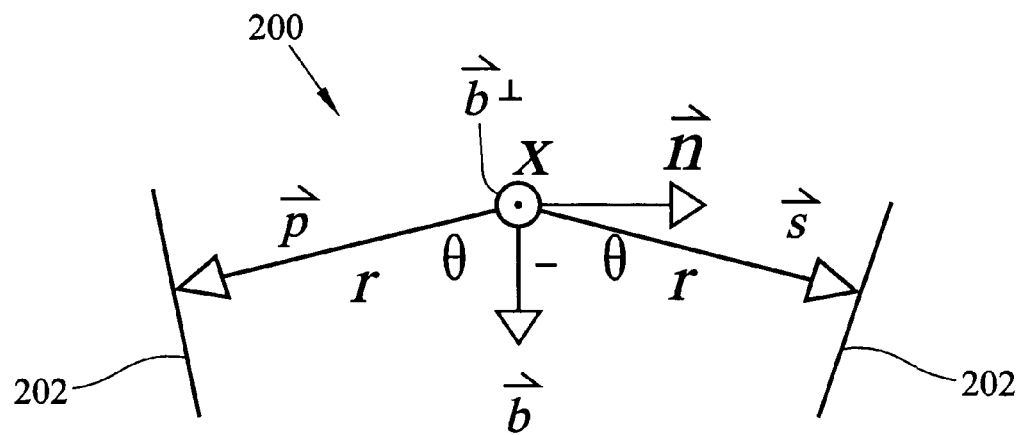
FIGS. 2A and 2B are vector diagrams of medial atoms according to embodiments of the present invention.
Figure 2B:
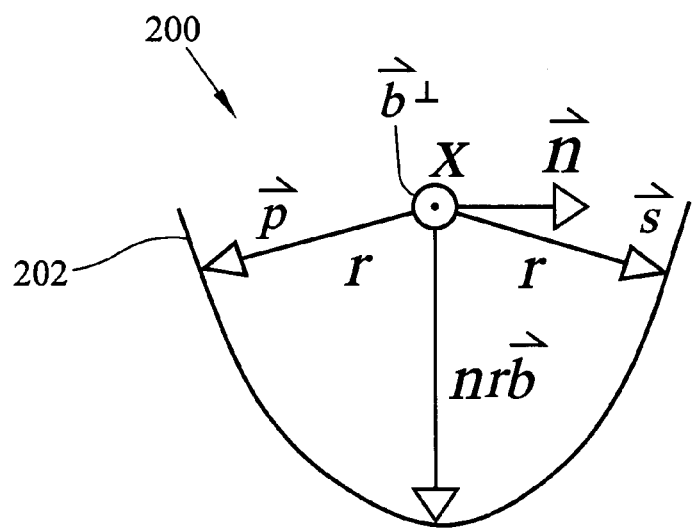

As stated above, a medial atom is a collection of vectors having predetermined relationships with respect to each other and with respect to one or more medial axes. FIGS. 2A and 2B illustrate examples of medial atoms according to embodiments of the present invention. Referring to FIG. 2A, medial atom 200 is characterized by a first position X that represents the location of the medial atom along a medial axis in a figure. Medial atom 200 is also characterized by boundary pointing vectors $\vec{p}$ and $\vec{s}$. The vectors $\vec{p}$ and $\vec{s}$ are analogous to "port" and "starboard" "sails" on a sailing vessel and are therefore referred to herein as port and starboard sails of a medial atom. The vectors $\vec{p}$ and $\vec{s}$ are separated by an angle $2\theta$. The vectors $\vec{p}$ and $\vec{s}$ terminate at tangent points along a boundary 202 of a model image. The length of each of vectors $\vec{p}$ and $\vec{s}$ is equal to r. A vector $\vec{b}^{\perp}$ perpendicular to the vector $\vec{b}$ and points out of the page in FIG. 2A. Yet another vector $\vec{n}$ is perpendicular to the vectors and $\vec{b}$ and $\vec{b}^\perp$ in the atom plane. The vectors and $\vec{b}$, $\vec{p}$, $\vec{s}$, $\vec{n}$, $\vec{b}^\perp$, and θ define a frame for medial atom 200.

In FIG. 2A, medial atom 200 may represent a slab-like section of the interior of an image. $\vec{p}$ and $\vec{s}$ provide links between the point X on the medial axis and the intersection with boundary 202. This collection of vectors gives approximation as to the position of the boundary and its relationship with regard to the normal. The implied figure section in FIG. 2A is slab-like and centered on the head of the atom sails. In FIG. 2B, medial atom 200 includes the same vectors as medial atom 200 illustrated in FIG. 2A. However, boundary 202 represents the end of an image. Accordingly, an additional parameter η is required to describe the curvature of boundary 202 at the end of the image. In one exemplary embodiment, η is equal to 1/cos θ.

Media atom modeling software 128 illustrated in FIG. 1 may include a modeling tool that allows the user to select medial atoms, such as those illustrated in FIGS. 2A and 2B, and use the medial atoms to create stock models, which may be compared to image data. Accordingly, medial atoms may have graphical representations similar to those illustrated in FIGS. 2A and 2B, as well as internal mathematical representations indicating the sizes, lengths, and angular separations of the various vectors.

Examples of Modeling Three-Dimensional Images Using Medial Atoms

Figure 3A:
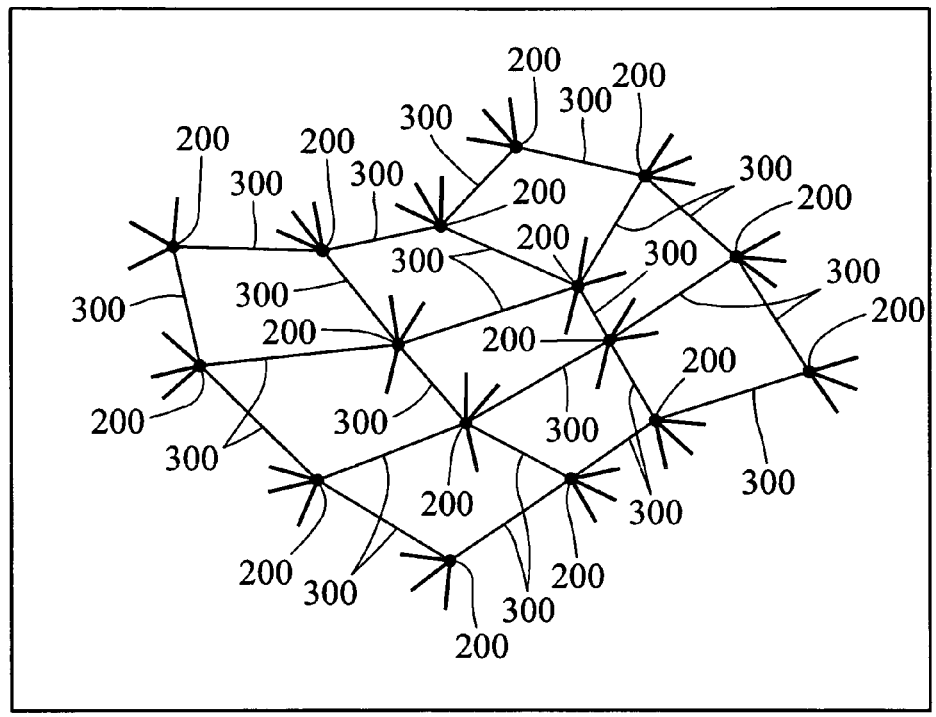
FIG. 3A is a perspective view of a model of a slab-like figure created using medial atoms according to an embodiment of the present invention.
Figure 3B:
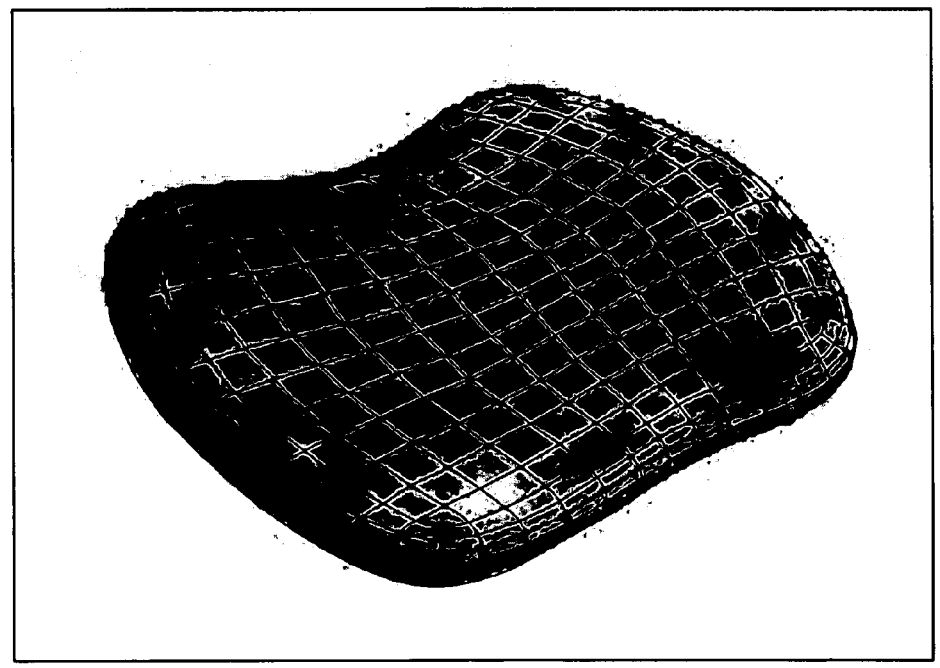
FIG. 3B is a perspective view of the surface implied by the medial atom model illustrated in FIG. 3A.

Discreet quantities of medial atoms can be used to model two- and three-dimensional objects and object image data. Two generic types of three-dimensional models that may be formed using medial atoms include slabs and tubes. FIG. 3A illustrates an example of medial atoms connected to imply a slab-like surface. In FIG. 3A, a plurality of medial atoms 200 are connected to each other via a plurality of medial axes 300. The port and starboard sail vectors emanate from the center point (point X in FIGS. 2A and 2B) to imply a boundary for a three-dimensional model. FIG. 3B illustrates the boundary implied by medial atoms 200 in FIG. 3A. As can be seen from FIG. 3B, medial atoms 200 can be connected together to form three-dimensional slab-like models of objects or object image data.

Figure 4A:
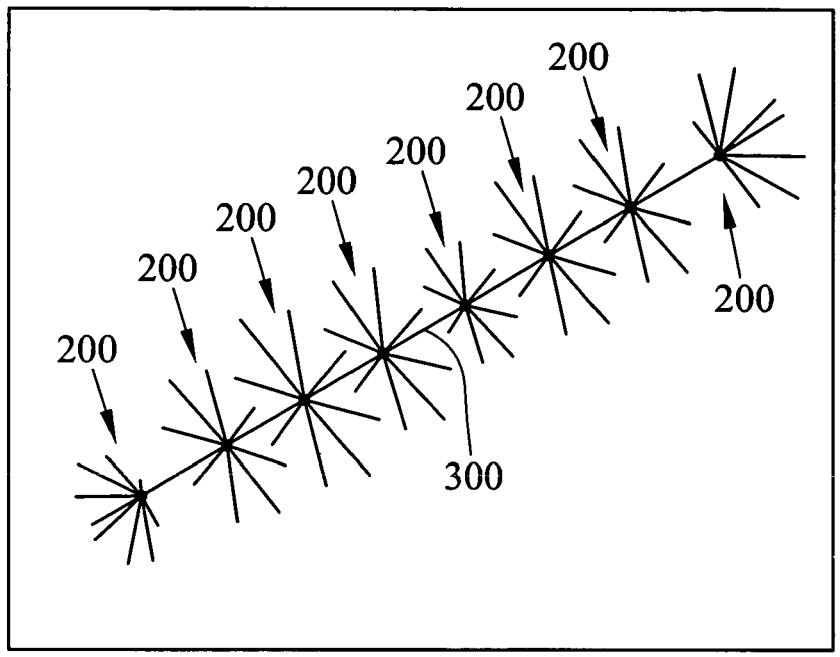
FIG. 4A is a perspective view of a medial atom model of a tube-like figure according to an embodiment of the present invention.
Figure 4B:
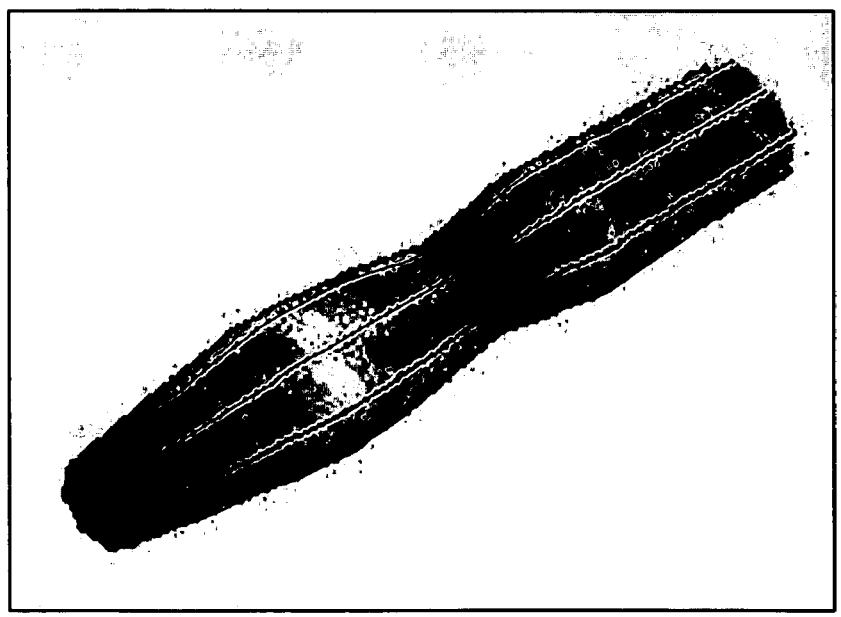
FIG. 4B is a perspective view of a tube-like surface implied by the medial atom model illustrated in FIG. 4A.

FIG. 4A illustrates an example of medial atoms connected together to form a tube-like surface. In FIG. 4A, back-to-back medial atoms 200 are aligned along a common, straight medial axis 300. The port and starboard sail vectors of medial atoms 200 imply a tube-like surface. FIG. 4B illustrates the tube-like surface implied by the medial atoms in FIG. 4A. Thus, FIGS. 4A and 4B illustrate that medial atoms can be combined to form models of three-dimensional tube-like objects and object image data. The structures illustrated in FIGS. 3A–4B can be modified and combined to form models of more complex images and objects, as will be described in more detail below.

Interpolation

In order to represent points on the surface of a figure that do not directly contact one of the vectors in a medial atom, interpolation is required. Interpolation may be achieved by applying a variant of subdivision surface methods, as described in Catmull E. and J. Clark, "Recursively Generated B-Spline Surfaces on Arbitrary Topological Meshes," *Computer Aided Design* 10: 183–188 (1978), the disclosure of which is incorporated herein by reference in its entirety, to the mesh of implied boundary positions in normals given at the sail ends (including the crest sails). The variant, described in detail in Thall, A., "Fast $C^2$ Interpolating Subdivision Surfaces Using Iterative Inversion of Stationary Subdivision Rules," University of North Carolina Computer Science Department Technical Report TR02-001, located at web page http://www.cs.unc.edu/Research/MIDAG/pubs/papers/, the disclosure of which is incorporated herein by reference in its entirety, makes the subdivision surface match the position and the normal of the sail ends to within predetermined tolerances. The boundary position is $C^2$ smooth everywhere except isolated points corresponding to the atoms at the corner of the mesh. From this surface, Thall's method allows the calculation of interpolated medial atoms.

FIGS. 5A–5D illustrate the modeling of a single figure using medial atoms and the corresponding interpolation. Referring to FIG. 5A, a discreet set of medial atoms 200 for a single figure model are shown. The dashed lines interconnecting the medial atoms represent medial axes for the model. In FIG. 5B, boundary lines are shown interconnecting the sail points of each of medial atoms 200 to imply a coarse mesh for the object being modeled.

At the ends of the model, the medial atoms define the smoothness of the boundary surface. FIG. 5C illustrates one of the ends of the surface in FIGS. 5A and 5B. In FIG. 5C, the length of the n vectors of each medial atom define the smoothness of the end of the object being modeled.

FIG. 5D represents an interpolated boundary mesh generated based on the model in FIG. 5B. The boundary illustrated in FIG. 5D touches the ends of the port and starboard sail vectors illustrated in FIGS. 5A–5C. The points on the surface illustrated in FIG. 5D that do not directly touch one of the medial atom vectors are determined based on interpolation using Thall's method described above. Thus, by using interpolation, medial atom modeling software according to an embodiment of the present invention can produce smooth three-dimensional surface models.

Model-Based Coordinate System

According to an important aspect of the invention, model can be represented using a model-based coordinate system. As used herein, term "model-based coordinate system" refers to a coordinate system that is based on the medial atom model, rather than a model-independent coordinate system, such as Cartesian coordinate system. If a medial atom model includes multiple figures, each figure is preferably represented in its own figure-based coordinate system. For example, in a medial atom model of a hand, the palm figure and each finger figure may be represented in its own figure-based coordinate system.

In one exemplary embodiment of the invention, each point in a medial-atom-based model can be represented by model-based coordinates u, v, and t or u, v, t, and τ, depending on whether the point is inside or outside of the model. The parameter u represents the position along the medial axis. The parameter v represents the side of the medial axis on which the point appears. The parameter t represents the distance in figural width along the appropriate medial sail in the specified position. Using a model-based coordinate system allows a determination of correspondence between different models. For example, a point on a boundary of a model can be compared to a corresponding point before the model is deformed. In addition, an intensity in a target image at a model-based coordinate relative to a putatively deformed model can be compared to the intensity in a training image at a corresponding model-based coordinate relative to the un-deformed model.

Figure 6A:
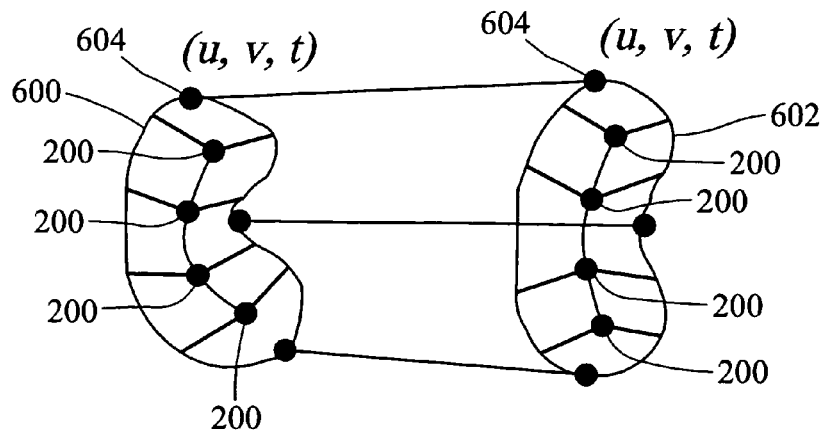
FIGS. 6A and 6B are side views of medial atom models illustrating a model-based coordinate system according to an embodiment of the present invention.
Figure 6B:
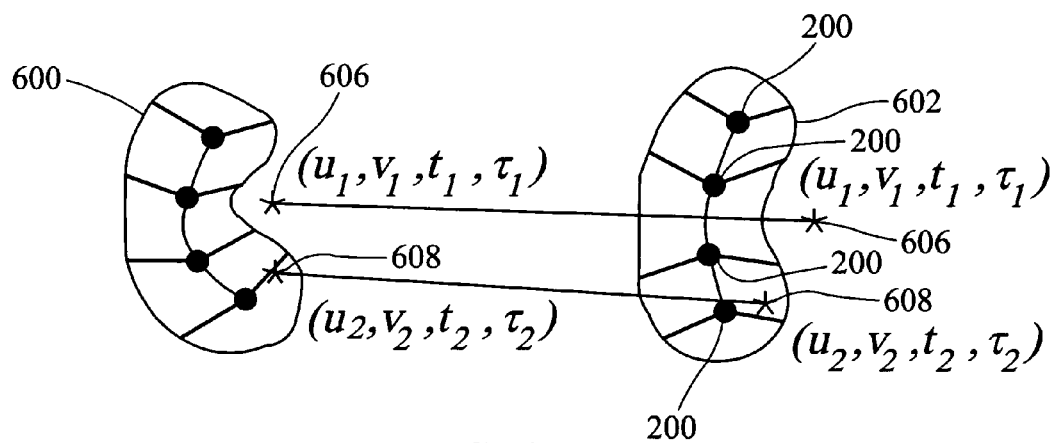

FIGS. 6A and 6B illustrate modeling objects in model-based coordinates according to an embodiment of the present invention. Referring to FIG. 6A, model 600 is a two-dimensional medial atom model before deformation. Model 602 is a medial atom model after deformation. A point 604 on the surface of medial atom model 600 characterized by parameters (u, v, t) can be tracked and compared to the corresponding point 604 in post-deformation model 602. Similarly, in FIG. 6B, pre-deformation model 600 includes a point 606 outside of its boundaries and another point 608 inside of its boundaries characterized by model-based coordinates $(u_1, v_1, t_1, \tau_1)$ and $(u_2, v_2, t_2, \tau_2)$, respectively. These coordinates can be used to locate the corresponding point in post-deformation model 602.

According to another aspect of the invention, the model-based coordinate system may be used to represent one model in another model's coordinate system and vice versa. For example, it may be desirable to track the relative positions of multiple real world objects with respect to each other. One example in which such modeling may be useful is in tracking organs in the abdomen of a human. In this situation it may be desirable to track the position of one organ relative to one or more other organs. According to the present invention, a model of each organ may be generated using medial atoms as described above. Next, the medial atom model of one organ can be placed in the model-based coordinate system of another organ model and vice versa. Representing medial atom models in each other's coordinate systems facilitates tracking of movement and orientation of objects being modeled relative to each other.

Figure 6C:
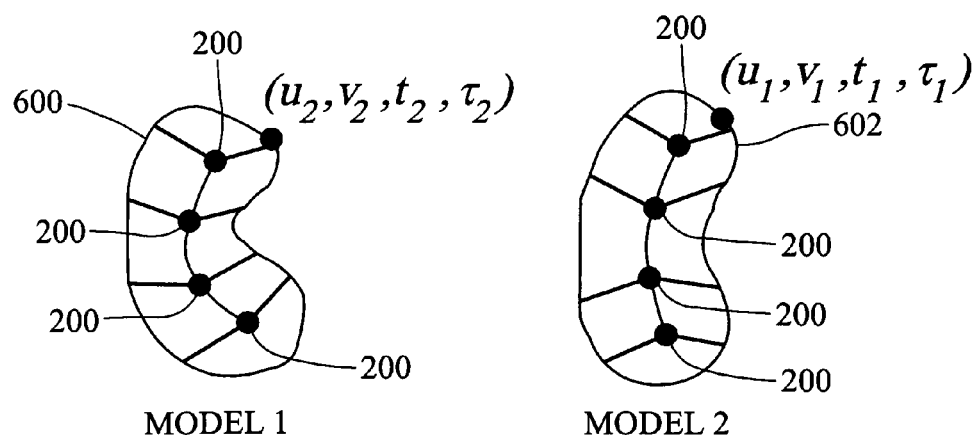
FIG. 6C is a side view illustrating the representation of one medial atom model in the model-based coordinate system of another medial atom model according to an embodiment of the present invention.

FIG. 6C illustrates an example of representing a medial atom model in the coordinate system of another medial atom model. In FIG. 6C, a first medial atom model 600, labeled "Model 1," is represented by coordinates $(u_2, v_2, t_2, \tau_2)$, which are medial atom coordinates of another medial atom model 602, labeled "Model 2." Similarly, a point on the surface of Model 2 is represented by medial coordinates $(u_1, v_1, t_1, \tau_1)$, which are medial coordinates of Model 1. Thus, by allowing medial atom models to be represented in each other's coordinate systems, the present invention facilitates tracking of changes between medial atom models.

Figure 7:
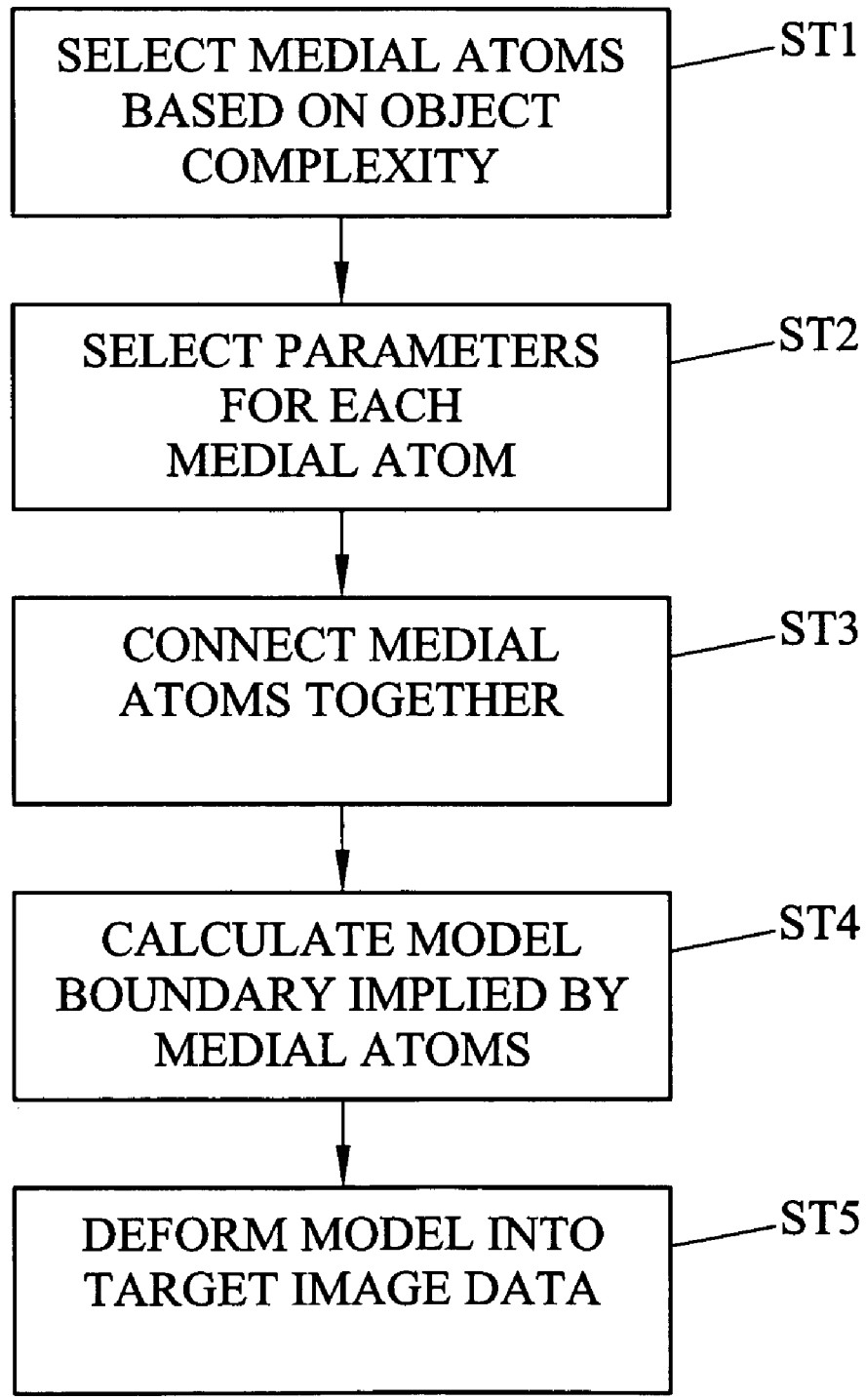
FIG. 7 is a flow chart illustrating exemplary steps for modeling a 3-D object or image data using medial atoms and for deforming the model into image data according to an embodiment of the present invention.

Image Modeling Tool for Modeling Object and Object Image Data Using Medial Atoms and Automatically Deforming Stock Models into Target Image Data Now that the concepts of medial atoms, modeling image data using medial atoms, and model-based coordinate systems have been introduced, exemplary steps modeling objects and images using medial atoms and for automatically deforming models to match image data will now be described. FIG. 7 is a flow chart illustrating exemplary steps that may be performed in modeling objects and image data using medial atoms according to an embodiment of the present invention. Referring to FIG. 7, in step ST1 the user selects medial atoms to be used in a model. The number of medial atoms depends on the complexity and the desired granularity of the model. For example, it would take more medial atoms to model a complex structure, such as a hand, than to model a non-complex structure, such as a kidney. The entity being modeled may be a real world object, a photograph of a real world object, or digitized image data.

In step ST2, the user selects parameters for each of the medial atoms. Selecting parameters for each of the medial atoms includes choosing the links of the various vectors in the medial atoms and the angles between the vectors. In step ST3, the medial atoms are connected together along a medial access as described above. In step ST4, an implied boundary is generated based on the medial atoms. The implied boundary may be generated using interpolation between sail points, as described above.

Once the model has been created, the model can be used for a variety of purposes. One purpose is to measure changes in time of image data or of real-world objects. For example, if it is desirable to determine how a person's kidney changes over time, an image, such as CT scan, may be obtained a first instance in time. A medial atom model may be generated based on the first image data using steps ST1–ST4 described above. At a later time, another set of image data of the kidney may be obtained. It may be desirable to determine whether the kidney has changed and how and where the kidney has changed. In order to perform such an operation, the model generated based on the first image data is automatically deformed into the image data generated at a later point and time. (step ST5). A method for automatically deforming a model into image data will be described in more detail below.

Displaying Target Image to User

Figure 8A:
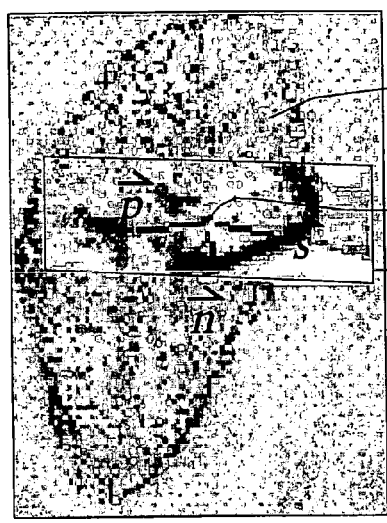
FIGS. 8A through 8E illustrate exemplary viewing planes that may be displayed to a user to facilitate modeling of three-dimensional image data using medial atoms according to an embodiment of the present invention.

In order to allow a user to model image data using medial atoms, the image data must be displayed to the user in a format that facilitates such modeling. If the target image data is three-dimensional, two-dimensional slices of the target image data may be presented to the user in order to allow the user to select the proper links for medial atom vectors. FIG. 8A illustrates exemplary target image data that medial atom modeling software 128 may display to a user and the corresponding medial atom model. In FIG. 8A, target image plane 800 represents a cross section of image data being modeled. The user selects a medial atom 200 and stretches the sails of medial atom 200 to contact boundaries of the slice of target image data 200 being modeled. This may be accomplished by clicking on medial atom 200 and elongating the sails of medial atom 200 until they touch what the user believes to be the boundary of the image data.

Figure 8B:
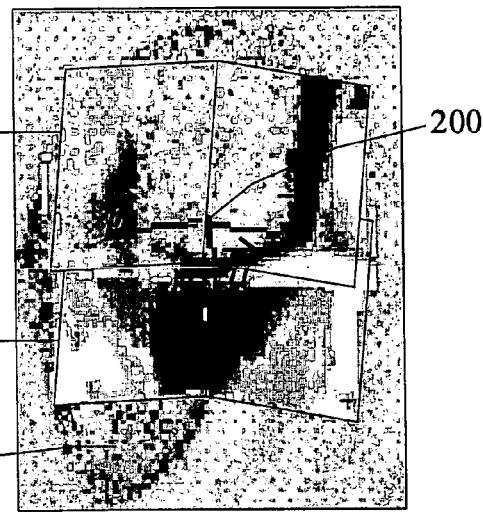
Figure 8C:
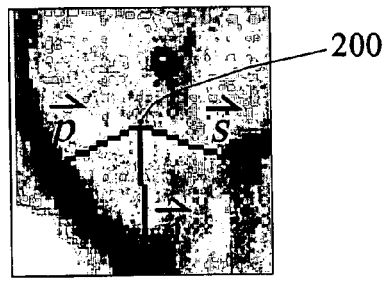
Figure 8D:
Figure 8E:
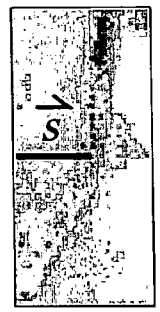

The result of selecting multiple medial atoms to model the image data is a medial atom model 802. FIG. 8B illustrates model 802 and views of sail half planes 804 and atom plane 806 for a medial atom 200. Displaying the sail half planes to the user may also allow the user to more accurately model the image data using medial atoms. FIG. 8C illustrates a view of an atom plane that may be displayed in two dimensions to the user. FIGS. 8D and 8E represent port sail and starboard sail planes and the corresponding port and starboard vectors of the medial atom that may be displayed to the user to help the user model image data using medial atoms. Thus, by displaying target image data to the user in various planes, an image modeling tool according to the present invention allows the user to accurately model image data using medial atoms.

Automatically Deforming Stock Images Into Target Image Data

Once a user has modeled an image using medial atoms, medial atom modeling software 128 of the present invention automatically deforms the user defined model into the target image data.

Multi-Scale Level Model Deformation Strategy for Segmentation from Target Images Medial atom modeling software 128 according to the present invention automatically deforms medial atom models into image data using model-directed segmentation of objects in volume data. The deformation begins with a manually chosen initial similarity transform of the model. To meet the efficiency requirements of accurate segmentation, the segmentation process then follows a number of stages of segmentation at successively smaller levels of scale. Table 1 shown below illustrates exemplary steps that may be performed in deforming a medial atom model into the target image data. At each scale level the model is the result of the next larger scale level, and medial atom modeling software 128 optimizes an objective function of the same form: the sum of a geometric typicality metric (described below) and a geometry-to-image match metric (described below). At each scale level there is a type of geometric transformation chosen appropriate to that scale and having no more than about 9 parameters.

The deformation strategy, from a model to a candidate obtained by geometrically transforming the model, follows two basic geometric principles:

1) In both the geometric typicality (a measure of how similar a model is to a typical geometry) and the model-to-image match metrics, all geometry is in figurally related terms. Thus,
   model-relative and candidate-relative positions correspond when they have common figural coordinates, and
   all distances are r-proportional.
2) Calculating geometric typicality at any scale level is done in terms of the relations relevant to that scale, i.e., relative to its values predicted by the previous, next larger, scale and by its neighbors at its scale. The neighborhood of a medial atom is made up of its immediately adjacent atoms, and the neighborhood of a boundary tile vertex is made up of the adjacent boundary tile vertices.

To describe the algorithm in detail, a number of definitions for the various transformations will now be described. The main two transformations are similarity transformations and elongation transformations. A similarity transformation involves scaling, rotating, and twisting a medial atom model to match target image data. An elongation transformation involves elongating the medial atom model to match the target image data. Similarity and elongation transformations are successively applied to a model as a whole and then to individual figures within the model. The application of the various transformations to different levels of a model is referred to herein as segmentation. The steps in performing a segmentation of a medial atom model to match target image data will now be described in detail.

TABLE 1

Geometry by Scale Level

| Scale Level k | Geometric entity | Transformation $S^k$ | Primitive $z_i^k$ | Transformation Parameters $\omega_i^k$ | Neighbors $N(z_i^k)$ |
| --- | --- | --- | --- | --- | --- |
| 1 | Model complex | Similarity | Model complex Pose | 7: 3D sim transf params | None |
| 2 | Model | Similarity | Model pose | 7: 3D sim transf params | Adjacent objects |
| 3 | Main figure | Similarity plus Elongation | Figure pose | 8: 3D sim transf params, 1 elongation param | Adjacent figures |
| 3 | Subfigure | Similarity in figural coordinates of its host's figural boundary, plus hinging and elongation | Figural pose in host's cords & elongation | 6: 4 2D sim transf params, 1 hinging param, 1 elongation param | Adjacent figures, possibly attached to same host |
| 4 | Through section of figure (medial atom) | Medial atom change | Medial atom Value | 8 (or 9): medial atom params (+η for external atoms) | 2–4 adjacent medial atoms |
| 5 | Boundary vertex | Displacement along medially implied normal | Boundary Vertex position | 1: displacement param | Adjacent boundary vertices |

The process begins with a model $z$ that is manually translated, rotated, and uniformly scaled into the image data by the user to produce an initial model $z^0$. $z^0$ is successively transformed through a number of scale levels into deformed models $z^k$ until $z^5$ is the final segmentation. The details and descriptions of the primitives, their neighbor relations, and the associated transformations at each scale level are given in Table 1.

Let $z^k$ be the geometric representation at scale level k. Let $z_i^k$ be the representation of the $i^{th}$ primitive at scale level k. At all scale levels $k \leq 4$, each $z_i^k$ is represented as a collection of medial atoms, and a geometric transformation on $z_i^k$ is computed by applying that transformation to each medial atom in its representation. Each primitive $z_i^k$ for k>1 has a small set of neighbors $N(z_i^k)$ at scale level k and a parent primitive $P(z_i^k)$ at scale level $k^{-1}$ but of the same type as $z_i^k$. That is, for $k \leq 4$ $P(z_i^k)$ is represented as a superset of the set representing $z_i^k$, and for k=5 the parent of a boundary vertex is the corresponding vertex on the medially implied surface with zero displacement. Also associated with scale level k is a type of transformation $S^k$ such that $z_i^k = S^k P(z_i^k)$. Let the parameters $\omega_i^k$ be the parameters of the particular transformation $S^k$ applied to $P(z_i^k)$ at scale level $k^{-1}$ to produce $z_i^k$ at scale level k.

The similarity transform S consisting of translation by $t$, rotation O and uniform scaling α applied to a medial atom $m = \{x, r, F, \theta\}$ produces $S \circ m = \{\alpha Ox + t, \alpha r, O \circ F, \theta\}$. Figural elongation by v leaves fixed the medial atoms at a specified atom row i (the hinge end for subfigures) and successively produces translations and rotations of the remaining atoms in terms of the atoms in the previously treated, adjacent row $i^-$, as follows:

$$S^3(v) \cdot \underline{m}_{ij} = \{x_{i^-j} + v(x_{ij} - x_{i^-j}), r_{ij}, (\underline{E}_{ij}\underline{E}_{i^-j}^{-1})^v \cdot \underline{E}_{i^-j}, \theta_{ij}\}$$

The subfigure transformation applies a similarity transform to each of the atoms in the hinge. This transformation, however, is not in Euclidean coordinates but in the figural coordinates of the boundary of the parent. The transformation to Euclidean coordinates is not essential in explaining the present invention, so its details are not described herein. The medial atom transformation $S^4$ translation by $\underline{t}$, rotation O, r scaling $\alpha$, and object angle change $\Delta\theta$ applied to a medial atom $\underline{m} = \{x, r, \underline{F}, \theta\}$ produces $S^4(\underline{t}, O, \alpha, \Delta\theta) \circ \underline{m} = \{x + \underline{t}, \alpha r, O \circ \underline{F}, \theta + \Delta\theta\}$. The boundary displacement transformation $\tau$ applied to a boundary vertex with position y, medial radial width r, and medially implied normal $\vec{n}$ yields the position $y + \tau r \vec{n}$.

The algorithm for segmentation successively modifies $\underline{z}^{k-1}$ to produce $\underline{z}^k$. In doing so it passes through the various primitives $\underline{z}^k_i$ in $\underline{z}^k$ and for each i optimizes an objective function $H(\underline{z}^k_i, \underline{z}^{k-1}, I) = w^k[-\text{Geomdiff}(\underline{z}^k, \underline{z}^{k-1})] + \text{Match } \underline{z}^k$, I). Geomdiff($\underline{z}^k, \underline{z}^{k-1}$) measures the geometric difference between $\underline{z}^k$ and $\underline{z}^{k-1}$, and thereby $-\text{Geomdiff}(\underline{z}^k, \underline{z}^{k-1})$ measures the geometric typicality of $\underline{z}^k$ at scale level k. Match ($\underline{z}^k$, I) measures the match between the geometric description $\underline{z}^k$ and the target image I. Both Geomdiff($\underline{z}^k, \underline{z}^{k-1}$), and Match($\underline{z}^k$, I) are measured in reference to the object boundaries $B^k$ and $B^{k-1}$, respectively implied by $\underline{z}^k$ and $\underline{z}^{k-1}$. The weight $w^k$ of the geometric typicality is chosen by the user.

For any medial representation $\underline{z}$, the boundary B is computed as a mesh of quadrilateral tiles as follows, with each boundary tile vertex being known both with regards to its figural coordinates $\underline{u}$ and its Euclidean coordinates $\underline{y}$. For a particular figure, $\underline{u} = (u, v, t)$, as described above. When one figure is an attached subfigure of a host figure, with the attachment along the v coordinate of the subfigure, there is a blend region whose boundary has coordinates $\underline{u} = (v, w, t)$, where v and t are the figural coordinates of the subfigure and $w \in [-1, 1]$ moves along the blend from the curve on the subfigure terminating the blend ($w = -1$) to the curve on the host figure terminating the blend ($w = +1$). This blending procedure is detailed in Liu, G. S., S. M. Pizer, S. Joshi, A. G. Gash, P. T. Fletcher and Q. Han, "Representation and Segmentation of Multifigure Objects via M-Reps", University of North Carolina Computer Science Department technical report TR02-037, located at web page http://www.cs.unc.edu/Research/MIDAG/pubs/papers/, the disclosure of which is incorporated by reference in its entirety.

As mentioned in above, the computation of B is accomplished by a variation of the technique described in the above-referenced Catmull publication of the mesh of quadrilateral tiles (or, in general, tiles formed by any polygon) formed from the two (or three sail ends of the medial atoms in $\underline{z}$. Thall's variation produces a limit surface that iteratively approaches a surface interpolating in position to sail ends and with a normal interpolating the respective sail vectors. That surface is a B-spline at all but finitely many points on the surface. Medial atom modeling software 128 gives control of the number of iterations and of a tolerance on the normal and thus of the closeness of the interpolations. A method for extending this approach to the blend region between two subfigures is presently under evaluation.

Geomdiff($\underline{z}^k, \underline{z}^{k-1}$) is computed as the sum of two terms, one term measuring the difference between the boundary implied by $\underline{z}^k$ and the boundary implied by $\underline{z}^{k-1}$, and, in situations when $\underline{N}(\underline{z}^k_i)$ is not empty, another term measuring the difference between boundary implied by $\underline{z}^k$ and that implied by $\underline{z}^k$ with $\underline{z}^k_i$ replaced by its prediction from its neighbors, with the prediction based on neighbor relations in $P(\underline{z}^k_i)$. The second term enforces a local shape consistency with the model and depends on the fact that figural geometry allows a geometric primitive to be known in the coordinate system of a neighboring primitive. The weight between the neighbor term and the parent term in the geometrical typicality measure is set by the user. In one experiment used to test medial atom modeling software 128, the neighbor term weight was 0.0 in the medial atom stage and 1.0 in the boundary offset stage.

The prediction of the value of one geometric primitive $\underline{z}^k_j$ in a model from another $\underline{z}^k_i$ at the same scale level using the transformation $S^k$ is defined as follows. Choose the parameters of $S^k$ such that $S^k$ applied to the $\underline{z}^k$ subset of $\underline{z}^{k-1}$ is as close as possible to $\underline{z}^k$ in the vicinity of $\underline{z}^k_j$. Apply that $S^k$ to $\underline{z}^k$ to give predictions $(S^k \underline{z}^k)_j$. Those predictions depend on the prediction of one medial atom by another. Medial atom $\underline{z}^4_j = \{x_j, r_j, \underline{E}_j, \theta_j\}$ predicts medial atom $\underline{z}^4_i = \{x_i, r_i, \underline{E}_i, \theta_i\}$ by recording $T = \{(x_j - x_i)/r_j, (r_j - r_i)/r_j, \underline{E}_j\underline{E}_i^{-1}, \theta_j - \theta_i\}$, where $\underline{E}_j\underline{E}_i^{-1}$ is the rotation that takes frame $\underline{E}_i$ into $\underline{E}_j$. T takes $\underline{z}^4_i$ into $\underline{z}^4_j$ and when applied to a modified $\underline{z}^4_i$ produces a predicted $\underline{z}^4_j$.

The boundary difference Bdiff($\underline{z}_1, \underline{z}_2$) between two models $\underline{z}_1$ and $\underline{z}_2$ is given by the following average r-proportional distance between boundary points that correspond according to their figural coordinates, although it could involve points with common figural coordinates other than at the boundary and it will in the future involve probabilistic rather than geometric distance measures. Bdiff $$(\underline{z}_1, \underline{z}_2) = \left[ -\int_{B_2} \frac{\|\underline{y}_1 - \underline{y}_2\|^2}{2(\sigma r(\underline{y}_2))^2} d\underline{y} \right] / \text{area}(B_2).$$

The r-value is that given by the model at the present scale level, i.e., the parent of the primitive being transformed. The normalization of distance by medial radius r makes the comparison invariant to uniform scaling of both the model and the deformed model for the local geometric component being adjusted at that scale level.

Finally, the geometry to image match measure Match($\underline{z}^k$, I) between the geometric description $\underline{z}^k$ and the target image I is given by $$\int_{-\tau_{max}}^{\tau_{max}} \int_{B^k} G(\tau) I_{template}(\underline{y}, \tau) \hat{I}(\underline{y}', \tau) d\underline{y} d\tau$$

where y and y' are boundary points in $B(\underline{z}^k)$ and $B(\underline{z}_{template}^k)$ that agree in figural coordinates, $G(\tau)$ is a Gaussian in $\tau$, I is the target image/rms-normalized with Gaussian weighting in the boundary-centered collar $\tau \in [-\tau_{max}, \tau_{max}]$ for the deformed model candidate (see FIG. 7), and the template image $I_{template}$ and the associated model $\underline{z}_{template}$ are described below.

In summary, for a full segmentation of a multi-model complex, there is first a similarity transformation of the whole complex, then a similarity transform of each model, then for each of the figures in turn (with parent figures optimized before subfigures) first a similarity-like transform that for protrusion and indentation figures respects their being on the surface of their parent, then modification of all parameters of each medial atom. After all of these transformations are complete, there is finally the optimization of the dense boundary vertices implied by the medial stages. Since only the segmentation of single figure objects is described herein, there are three stages beyond the initialization: the figural stage, the medial atom (figural section) stage, and the boundary offset stage.

For all of the stages with multiple primitives, such as the medial atom stage and the boundary stage, the strategy of iterative conditional modes is followed, so the algorithm cycles among the atoms in the figure or boundary in random order until the group converges. The geometric transformation of a boundary vertex modifies only its position along its normal [1 parameter]; the normal direction changes as a result of the shift, thus affecting the next iteration of the boundary transformation.

The Optimization Method and Objective Function

Multiscale segmentation by deformable models requires many applications of optimization of the objective function. The optimization must be done at many scale levels and for increasingly many geometric primitives as the scale becomes smaller. Efficient optimization is thus necessary. Both evolutionary approaches and a conjugate gradient approach to optimization have been tried. The significant speed advantages of the conjugate gradient method are utilizable if one can make the objective function void of nonglobal optima for the range of the parameters being adjusted that is guaranteed by the previous scale level. Accordingly, the objective functions used herein are designed to have as broad optima as possible and chosen the fineness of scale levels and intra-level stages to guarantee that each stage or level produces a result within the bump-free breadth of the main optimum of the next stage or level.

When the target image is noisy and the object contrast is low, the interstep fineness requirement described above requires multiple substages of image blurring within a scale level. That is, at the first substage the target image must be first blurred before being used in the geometry to image match term. At later substages the blurring that is used decreases.

The objective function used to evaluate embodiments of the present invention may be a log posterior probability. If a log posterior probability is used for the objective function, both terms in the objective function will be probabilistic, as determined by a set of training images. These terms then would be a log prior for the geometric typicality term and a log likelihood for the geometry to image match term. In this situation there is no issue weighting the geometric typicality and geometry to image match terms. However, at present the geometric typicality term is measured in r-proportional squared distances from model-predicted positions and the geometry to image match term is measured in rams-proportional intensity squared units resulting from the correlation of a template image and the target image, normalized by local variability in these image intensities. While this strategy allows the objective function to change little with image intensity scaling or with geometric scaling, it leaves the necessity of setting the relative weight between the geometric typicality term and the geometry to image match term. In medial atom modeling software 128 this weight may be interactively set.

The remainder of this section consists of a subsection detailing the geometry-to-image match term of the objective function, followed by a section detailing the boundary offset stage of the optimization.

The Geometry-to-Image Match Measure

It is useful to compute the match between geometry and the image based on a model template. Such a match is enabled by comparing the template image $I_{template}$ and the target image data I at corresponding positions in figural coordinates, at figural coordinates determined in the model. The template is presently determined from a single training image $I_{template}$, in which the model z has been deformed to produce $z_{template}$ by applying the m-reps deformation method through the medial atom scale level (level 4) on the characteristic image corresponding to a user-approved segmentation. In the present implementation, the template is defined only in a mask region defined by a set of figural coordinates, each with a weight of a Gaussian in its figural distance-to-boundary, $\tau$, about the model-implied boundary. An exemplary standard deviation that may be used is equal to ½ of the half-width of a collar surrounding the model-implied boundary. The mask is selectable as a collar symmetrically placed about the boundary up to a user-chosen multiple of r from the boundary or as the union of the object interior with the collar, a possibility especially easily allowed by a medial representation.

Figure 9:
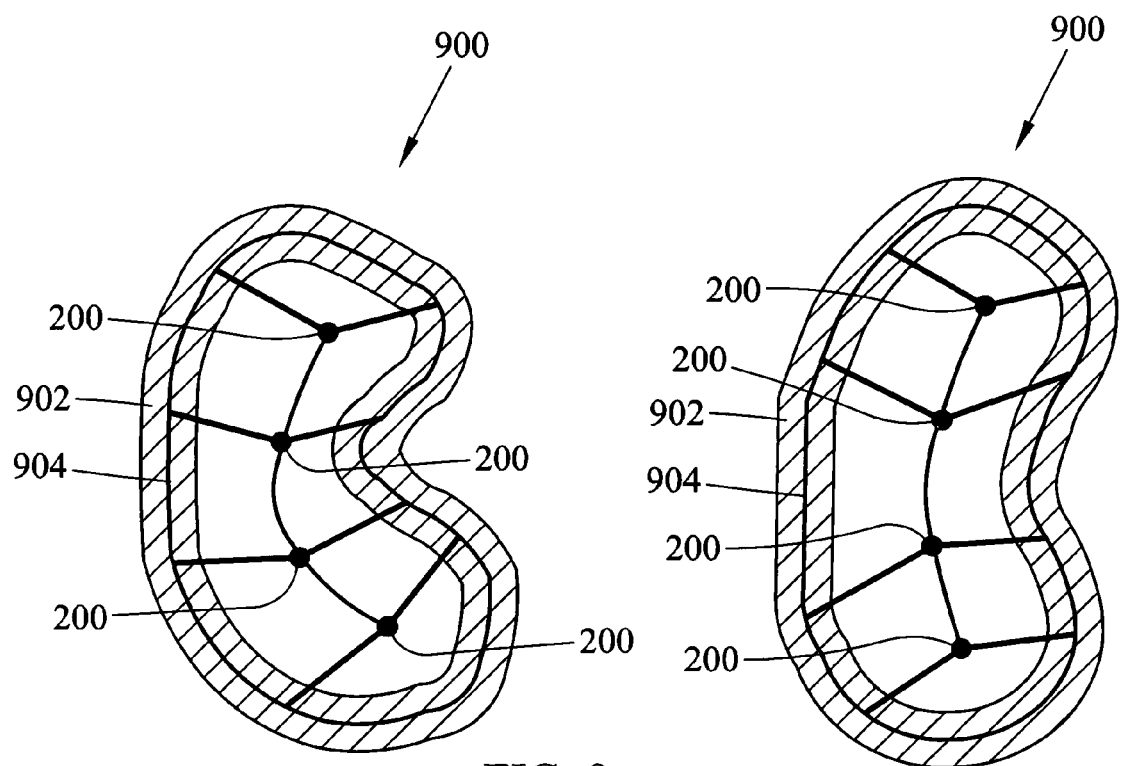
FIG. 9 is a side view of pre- and post-deformation medial atom models according to an embodiment of the present invention.

FIG. 9 illustrates an image 900 both before and after deformation. In FIG. 7, a boundary collar 902 defines a symmetric border around implied boundary 904. The mask is chosen by subdividing the boundary positions affected by the transformation with a fixed mesh of figural coordinates (u,v) and then choosing spatial positions to be spaced along each medial sail (implied boundary normal) at that (u,v). These along-sail positions are equally spaced in the figural distance coordinate $\tau$ up to a plus or minus a fixed cutoff value $\tau_{max}$ chosen at modeling time. An exemplary cutoff value that may be used is 0.3, so the standard deviation of the weighting Gaussian in the intensity correlation is 0.15.

The template-to-image match measure is selectable in medial atom modeling software 128 from among a normalized correlation measure, with weights, and a mutual information measure, with weights, but for all the examples here the correlation measure has been used and the weight in all mask voxels is unity. The correlation measure used is an average, over the boundary sample points, of the along sail intensity profile correlations at these sample points. For the geometry to correspond to the volume integral of these point-to-corresponding-point correlations, each profile must be weighted by the boundary surface area between it and its neighboring sample points, and the profile must be weighted by its r-proportional length. In addition, as indicated above, each product is weighted in the correlation by a Gaussian in $\tau$ from the boundary. Also, to make the intensity profiles insensitive to offsets and linear compression in the intensity scale, the template is offset to a mean of zero and both the template and the target image are rms-normalized. The template's rms value is computed within the mask in the training image, and the target image's rms value is computed for a region corresponding to a blurred version of the mask after the manual placement of the model.

In medial atom modeling software 128, the template is selectable from among a derivative of Gaussian and the intensity values in the training image in the region. In each case, the template is normalized by being offset by the mean intensity in the mask and normalized in rms value.

The derivative of Gaussian template for model-to-image match is built in figural coordinates in the space of the model, i.e., the space of the training image. That is, each along-sail template profile, after the Gaussian mask weighting, is a derivative of a Gaussian with a fixed standard deviation in the figural coordinate τ, or equivalently an r-proportional standard deviation in Euclidean distance. The value 0.1 is chosen as the value of the standard deviation in τ. Since this template is associated with the target image via common figural coordinates, in effect the template in the target image space is not a derivative of 3D Gaussian but a warped derivative of 3D Gaussian, with the template's standard deviation in spatial terms increases with the figural width.

Boundary Offset Optimization

The boundary deformation stage is similar to active surfaces, except that the geometric typicality term consists not only of a term measuring the closeness of each boundary offset to that at each of the neighboring boundary positions but also a term measuring the log probability of these offsets in the medially based prior. Since the tolerance of the medially implied boundary is r-proportional, the log Gaussian medially based prior, conditional on the medial estimate, is proportional to the negative square of the r-normalized distance to the medially implied boundary (See Chen, D. T., S. M. Pizer, J. M. Whitted, Using Multiscale Medial Models to Guide Volume Visualization. Tech report TR99-014, Dept. of Comp. Sci., Univ. of North Carolina at Chapel Hill, (1999).

The method of Joshi, S., S. Pizer, P. T. Fletcher, A. Thall, G. Tracton (2001). Multi-scale 3-D Deformable Model Segmentation Based on Medial Description, *Information Processing in Medical Imaging* 2001 (IPMI '01), Lecture Notes in Computer Science, Springer 2082: 64–77 (2001), with which the segmentation is completed, uses this combined geometric typicality measure, and its boundary to image match measure is a log probability based on the object and its background each having normal intensity distributions.

CONCLUSIONS

The steps described above for applying similarity and elongation transformations to successive levels in a medial atom model allow natural deformations, such as model thickening, thinning, twisting, rotating, elongating, etc., to be performed. Performing such transformations using medial atoms in figural coordinates greatly reduces the computational effort required to perform such transformations over conventional modeling methods that utilize model-independent coordinates. As a result, the medial atom modeling and deformation methods of the present invention are faster and less labor-intensive than conventional three-dimensional modeling techniques.

It will be understood that various details of the invention may be changed without departing from the scope of the invention. Furthermore, the foregoing description is for the purpose of illustration only, and not for the purpose of limitation—the invention being defined by the claims.

What is claimed:

1. A method for modeling three-dimensional object image data using medial atoms, the method comprising:
   (a) selecting three-dimensional medial atoms to be included in a three-dimensional medial atom model of three-dimensional object image data, the three-dimensional object image data including a set of data including pixel intensities representing an object and collected by a sensor, each medial atom including at least two vectors having a common tail;
   (b) selecting parameters that define dimensions of each medial atom, wherein selecting parameters that define dimensions of each medial atom includes selecting lengths of the at least two vectors such that the at least two vectors contact surfaces of the object image data being modeled; and
   (c) connecting the medial atoms together to form the three-dimensional medial atom model.

2. The method of claim 1 wherein selecting three-dimensional medial atoms to be included In a medial atom model includes manually selecting the three-dimensional medial atoms to be included in the medial atom model.

3. The method of claim 1 wherein selecting parameters that define dimensions of each medial atom includes selecting lengths and angular spacings for the vectors in each medial atom.

4. The method of claim 1 wherein connecting the medial atoms together includes connecting the tails the medial atoms together using at least one medial axis.

5. The method of claim 1 comprising generating a surface representing a boundary of a three-dimensional object implied by the medial atoms.

6. The method of claim 1 comprising generating a surface representing a boundary of three-dimensional object image data implied by the medial atoms.

7. The method of claim 1 comprising representing the medial atom model in a model-based coordinate system.

8. The method of claim 7 wherein representing the medial atom model in a model-based coordinate system includes representing each point in the medial atom model by at least a position along a medial axis and a perpendicular displacement from the medial axis.

9. The method of claim 7 wherein representing the medial atom model in a model-based coordinate system includes representing the medial atom model in its own model-based coordinate system.

10. The method of claim 7 wherein representing the medial atom model in a model-based coordinate system includes representing the medial atom model in a model-based coordinate system of another medial atom model.

11. The method of claim 1 wherein the medial atom model includes a plurality of figures, each figure having its own figure-based coordinate system.

12. The method of claim 1 wherein the medial atom model includes a plurality of figures, each figure being represented in a figure-based coordinate system of another figure.

13. The method of claim 1 wherein generating the medial atom model includes generating a plurality of medial atom models, each model having its own model-based coordinate system.

14. The method of claim 1 comprising automatically deforming the model to match target image data.

15. The method of claim 14 wherein automatically deforming the model includes resizing at least one of the medial atoms to alter a surface implied by the medial atoms.

16. The method of claim 14 wherein automatically deforming the model includes increasing lengths of at least two of the vectors in a medial atom to thicken the model.

17. The method of claim 14 wherein automatically deforming the model includes increasing lengths of at least two of the vectors in a medial atom to thin the model.

18. The method of claim 14 wherein automatically deforming the model includes rotating at least one of the medial atoms to twist a surface of the model.

19. The method of claim 14 wherein automatically deforming the model includes moving at least one of the medial atoms to bend a surface of the model.

20. The method of claim 14 wherein the target image is an anatomical image.

21. The method of claim 14 wherein the target image is an image of a mechanical structure.

22. The method of claim 1 wherein each medial atom includes a first boundary pointing vector originating at a first position X representing a location of the medial atom along a medial axis and terminating at a first tangent point on a surface of the object image data and a second boundary pointing vector originating at the position X and terminating at a second tangent point on a surface of the object image data.

23. The method of claim 22 wherein the medial axis comprises a set of points equidistant from tangent points on opposite surfaces of the model and located at intersections of orthogonal lines from the tangent points within the opposite surfaces.

24. The method of claim 1 wherein the three-dimensional object image data comprises a magnetic resonance (MR) image of an anatomical structure.

25. The method of claim 1 wherein the three-dimensional object image data comprises a computerized tomography (CT) image of an anatomical structure.

26. A computer program product comprising computer-executable instructions embodied in a computer-readable medium for performing steps comprising:
(a) selecting three-dimensional medial atoms to be included in a three-dimensional medial atom model of three-dimensional object image data, the three-dimensional object image data including a set of data including pixel intensities representing an object and collected by a sensor, each medial atom including at least two vectors having a common tail;
(b) selecting parameters that define dimensions of each medial atom, wherein selecting parameters that define dimensions of each medial atom includes selecting lengths of the at least two vectors such that the at least two vectors contact surfaces of the object image data being modeled; and
(c) connecting the medial atoms together to farm the three-dimensional medial atom model.

27. The computer program product of claim 26 wherein selecting three-dimensional medial atoms to be included in a medial atom model includes manually selecting the three-dimensional medial atoms to be included in the medial atom model.

28. The computer program product of claim 26 wherein selecting parameters that define dimensions of each medial atom includes selecting lengths and angular spacings for the vectors in each medial atom.

29. The computer program product of claim 26 wherein connecting the medial atoms together includes connecting the tails the medial atoms together using at least one medial axis.

30. The computer program product of claim 26 comprising generating a surface representing a boundary of a three-dimensional object implied by the medial atoms.

31. The computer program product of claim 26 comprising generating a surface representing a boundary of three-dimensional object image data implied by the medial atoms.

32. The computer program product of claim 26 comprising representing the medial atom model in a model-based coordinate system.

33. The computer program product of claim 32 wherein representing the medial atom model in a model-based coordinate system includes representing each point in the medial atom model by at least a position along a medial axis and a perpendicular displacement from the medial axis.

34. The computer program product of claim 32 wherein representing the medial atom model in a model-based coordinate system includes representing the medial atom model in its own model-based coordinate system.

35. The computer program product of claim 32 wherein representing the medial atom model in a model-based coordinate system includes representing the medial atom model in a model-based coordinate system of another medial atom model.

36. The computer program product of claim 26 wherein the medial atom model includes a plurality of figures, each figure having its own figure-based coordinate system.

37. The computer program product of claim 26 wherein the medial atom model includes a plurality of figures, each figure being represented in a figure-based coordinate system of another figure.

38. The computer program product of claim 26 wherein generating the medial atom model includes generating a plurality of medial atom models, each model having its own model-based coordinate system.

39. The computer program product of claim 26 comprising automatically deforming the model to match target image data.

40. The computer program product of claim 39 wherein automatically deforming the model includes resizing at least one of the medial atoms to alter a surface implied by the medial atoms.

41. The computer program product of claim 39 wherein automatically deforming the model includes increasing lengths of at least two of the vectors in a medial atom to thicken the model.

42. The computer program product of claim 39 wherein automatically deforming the model includes increasing lengths of at least two of the vectors in a medial atom to thin the model.

43. The computer program product of claim 39 wherein automatically deforming the model includes rotating at least one of the medial atoms to twist a surface of the model.

44. The computer program product of claim 39 wherein automatically deforming the model includes moving at least one of the medial atoms to bend a surface of the model.

45. The computer program product of claim 26 wherein the target image is an anatomical image.

46. The computer program product of claim 26 wherein the target image is an image of a mechanical structure.

47. The computer program product of claim 26 wherein each medial atom includes a first boundary pointing vector originating at a first position X representing a location of the medial atom along a medial axis and terminating at a tangent point on a surface of the object image data and a second boundary pointing vector originating at the position X and terminating at a second tangent point on a surface of the object image data.

48. The computer program product of claim 47 wherein the medial axis comprises a set of points equidistant from tangent points on opposite surfaces of the model and located at intersections of orthogonal lines from the tangent points within the opposite surfaces.

49. The computer program product of claim 26 wherein the three-dimensional object image data comprises a magnetic resonance (MR) image of an anatomical structure.

50. The computer program product of claim 26 wherein the three-dimensional object image data comprises a computerized tomography (CT) image of an anatomical structure.

* * * * *